T. F. CALLAHAN.
METHOD AND APPARATUS FOR SLUDGE REMOVAL.
APPLICATION FILED AUG. 15, 1918.
1,326,321.
Patented Dec. 30, 1919.
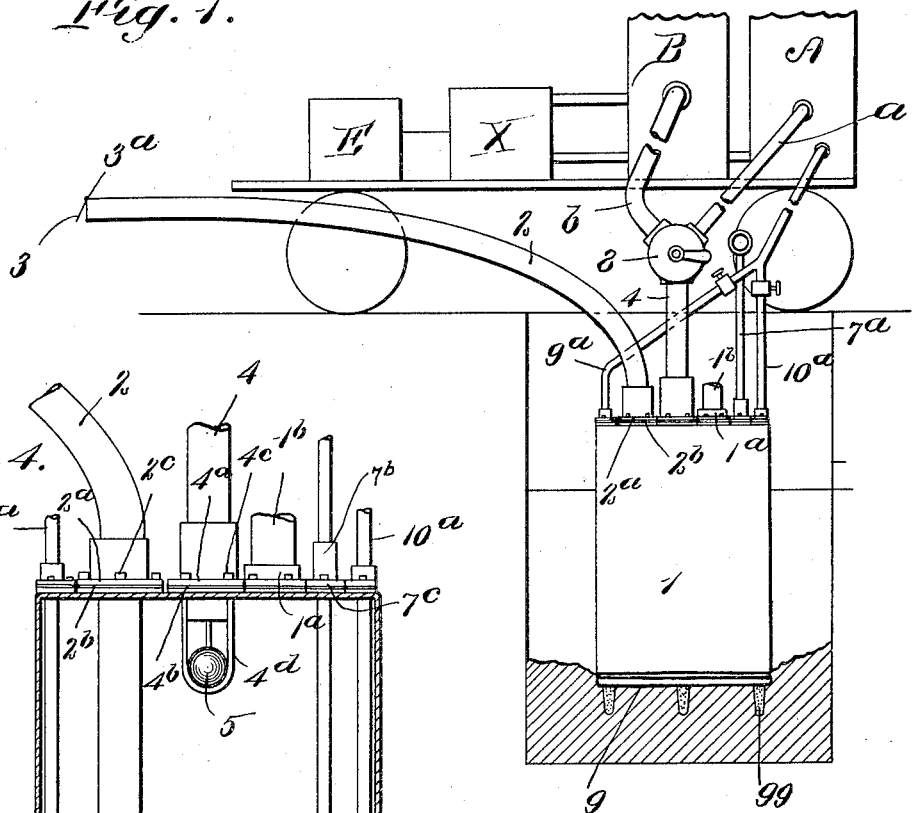
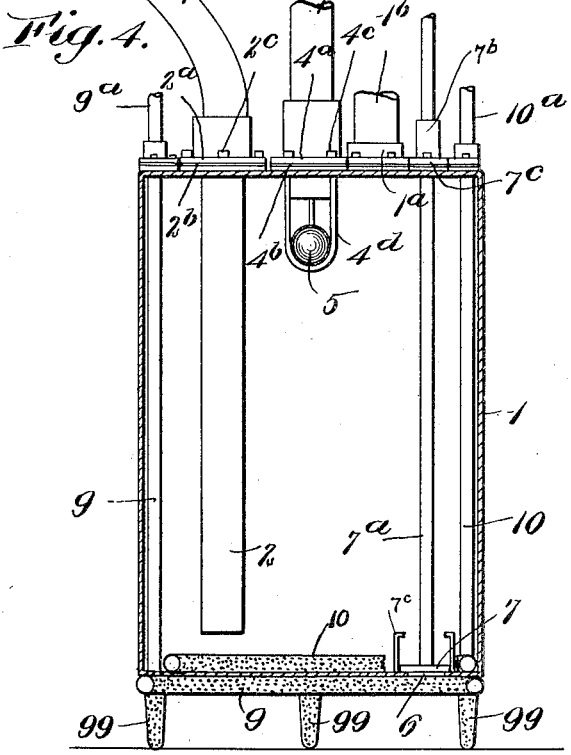
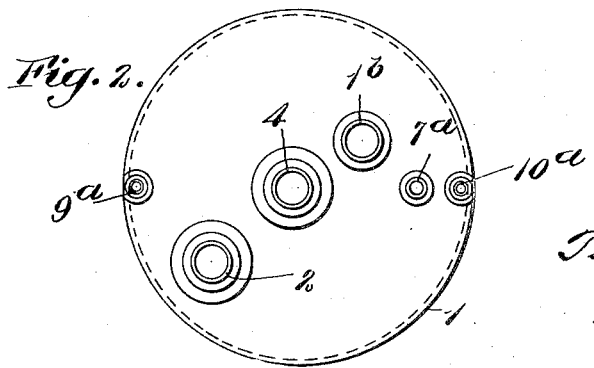
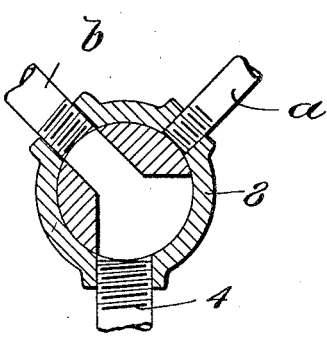

UNITED STATES PATENT OFFICE.

TIMOTHY F. CALLAHAN, OF QUINCY, MASSACHUSETTS, ASSIGNOR OF ONE-HALF TO EDGAR S. DORR, OF BOSTON, MASSACHUSETTS.

METHOD AND APPARATUS FOR SLUDGE REMOVAL.

1,326,321.   Specification of Letters Patent.   Patented Dec. 30, 1919.

Application filed August 15, 1918. Serial No. 249,955.

*To all whom it may concern:*

Be it known that I, TIMOTHY F. CALLAHAN, a citizen of the United States, residing at Quincy, in the county of Norfolk and State of Massachusetts, have invented certain new and useful Improvements in Methods and Apparatus for Sludge Removal, of which the following is a specification.

My invention is a method of and apparatus for removing from sewage catch basins the accumulated solid matter or "sludge."

The ordinary catch basin receives the street drainage, consisting largely of water, mixed with the washings of the street, pulverized material from the paving stones, surfacing material from macadamized roads, sand, leaves, straws, paper and the like, in short the material removed from the street surface by abrasion, plus the material that falls or is thrown into the street; all these things that escape removal by the street cleaners, are ultimately washed into the catch basin, which is designed to act as a settling basin, permitting the heavy material to settle to the bottom while the water overflows to the sewer. The resulting settlings form what is known as "sludge," and this sludge, owing to the large proportion of sand and pulverized stone of which it is commonly comprised, is dense and lies at the bottom of the basin in a compact mass.

It is necessary at intervals to remove the accumulated sludge deposited out of the water entering from the street. This has heretofore been commonly accomplished by a man entering the catch basin and shoveling the sludge into buckets which were then hoisted to the street and emptied into a suitable receptacle for removal. This method was slow, laborious, costly and disagreeable to the operators.

My method contemplates the use of compressed air to perform two important steps in the process of sludge removal while atmospheric pressure is employed in connection therewith. While by the hand method of removal of sludge the compact sludge in the catch basin is shoveled out, by my method the first step is to render the sludge, or a sufficient portion thereof, semi-liquid, and to keep it in that condition until the removing operation is complete. To this end the first step is to insert in the sludge the delivery end of one or more compressed air pipes, through which air may be violently discharged within the body of the sludge, acting upon the separate particles of the sludge and separating them, so that the superincumbent water may enter and thereafter the particles of the sludge are kept in a state of violent motion by the jets of air, expanding within the sludge and acting in conjunction with the water, in which the particles are kept floating, the final effect being on a vastly larger and more violent scale comparable to the sand which constantly floats in the water of a so-called "boiling" spring. The effect of this first step is to transform the heavy, compact sludge, by mixing it with water, in which its particles are suspended, into a semiliquid, capable of being handled by other means than those of scooping or shoveling. Into this semi-liquid mass is placed a fluid-tight engine, preferably of metal, the air is partially exhausted from the engine, a valve in the lower end thereof is opened and the semi-liquid sludge forced rapidly thereinto by atmospheric pressure. The engine thus loaded, the sludge-entry valve is closed, the vacuum producing means shut off and at the same time compressed air is admitted to the interior of the engine, acting to force the sludge toward the bottom of the engine, where an eduction pipe entering through the top of the engine and extending close to the bottom thereof, permits of the escape of the semi-liquid sludge upward, through the eduction pipe to the receiving and removing receptacle. During this discharge action, I prefer to release jets of compressed air within the engine close to the bottom thereof, to continue the action of violent agitation of the sludge and thus prevent any possibility of any settling or of the gradual accretion of a deposit of sludge on the bottom of the engine. This compressed air, so admitted, will rise to the top, and in certain cases may be utilized to accumulate the necessary pressure at the top of the engine to force the sludge content out of the engine. It will be obvious that the compressed air in evacuating the engine performs the functions of a piston in an ordinary force pump, while the tank of the engine corresponds to the cylinder of such a pump, but as there are no moving parts employed in the eduction the compressed air actuation of the semi-liquid mass is peculiarly adapted to material which is filled with solid particles of an abrasive character such as sand, and that this operation is rendered possible by reducing the compact sludge of the catch basin to a semi-liquid form. It will also be noted that the filling of the engine by atmospheric pressure is also rendered possible for the same reason.

When the air is exhausted from the engine, if the sludge-entry valve is of the ordinary self-acting kind, opening inward as soon as the pressure within and without the tank becomes unbalanced, the sludge will open the valve and begin to pass slowly to the interior and when the filling process is complete and compressed air is admitted to force the sludge out the valve will close and check the sludge from passing through the valve. As a practical matter, however, I prefer to positively control the sludge-entry valve, in any suitable manner, as shown in the drawings, by a rod passing through the tank and out through the upper end thereof, which may be manipulated. In this way it is easy to rarefy the air in the engine as much as possible and, suddenly opening the valve, cause the atmospheric pressure to become effective to its full extent on the instant of opening and the constant influx of sludge at maximum speed, carrying the suspended matter into the tank to the fullest extent.

In the drawings:

Figure 1 is a diagrammatic view of the assembly of the preferred means, for working my system;

Fig. 2 is a plan view of the upper end of the engine;

Fig. 3 is a detail in section of the two-way valve; and

Fig. 4 is a sectional elevation of the engine.

In the preferred method of working my system of sludge removal, a vehicle is employed upon which is mounted an air pump, with motor means for actuating the same, together with suitable tanks, one of which is to receive compressed air, while the other is a vacuum tank. Also, for use in connection therewith, an engine, comprising a fluid tight tank, having certain induction and eduction pipes and also apertures, controlled by suitable valves. The air pump and compression and vacuum tanks may be of any suitable sort, or other means of compressing and rarefying air may be employed if desired, and I have not deemed it necessary to elaborate these matters, it being sufficient to indicate a suitable arrangement diagrammatically, as in Fig. 1, showing the compression tank A and the vacuum tank B, together with an air pump X, which may be adjusted either to draw air from the tank B or force air into the tank A, at will, together with motor E, coupled to the air pump X, to actuate the same.

The sludge engine is shown in Figs. 1 and 4 and is made up of an air tight tank 1 of suitable dimensions, its diameter being such that it may be lowered through the opening at the top of the catch basin, into the catch basin. This sludge engine is provided with socket 1$^a$ by which it may be engaged by a suitable rod 1$^b$ to lower and raise it, and place it within the catch basin.

Passing through the top of the tank 1 into and nearly to the bottom thereof is an eduction pipe 2, at the delivery end of which is pivoted at 3$^a$ a flap or check valve 3, lifting outward to permit the uprush of the sludge under pressure, and assure the freest possible passage therefor and closing to prevent passage of air in the opposite direction. The pipe 2 carries a flange 2$^a$ between which and the top of tank 1 is inserted a soft gasket 2$^b$ and the pipe is removably secured in place by bolts 2$^c$ passing through the flange and gasket into screw threaded apertures in the top of tank 1, the gasket under compression rendering the joint air tight. Passing into the top of tank 1 is also a second pipe 4, serving alternately for the passage of air out of the tank and under compression, into the tank. It is obvious that two pipes might be employed for this purpose, but it is preferable to have as few joints and apertures as may be in the tank, and I have therefore given a single pipe a double function. Surrounding the inner end of the pipe 4 is a cage 4$^d$, within which is a globular float 5, which, as the sludge rises in the tank, as will presently be described, floats on the surface of the sludge, guided by the vertical bars of the cage 4$^d$, and blocks the entrance to the pipe 4. The pipe 4 is mounted and held as in the case of pipe 2, by a flange 4$^a$, gasket 4$^b$, and bolts 4$^c$.

In the bottom of tank 1, is an aperture 6, for the ingress of sludge, closed, when desired, by a valve 7, lifted by means of a rod 7$^a$, which passes through a stuffing box 7$^b$, mounted in an aperture in the top of the tank. It is obvious that a self-acting, inwardly opening check valve might be employed but I prefer the positively controlled valve, as shown. Guides 7$^c$ aline the valve.

Upon the upper end of pipe 4, is a two-way valve 8, by means of which the pipe 4 may at will be put in communication with the means for rarefying air, as described herein, the vacuum tank B, by means of a flexible pipe $b$ or with the source of compressed air, as described herein, the compression tank A, by means of a flexible pipe $a$. Obviously the employment of compression and vacuum tanks is not essential, as the air might be withdrawn from or forced into the engine directly if desired. The use of the tanks A and B is, however, preferable, as it makes possible the application of full force, instantly and continuously, either to load or unload the sludge engine and enables the air pump to do its work between operations or to operate continuously.

In the preferred form of my engine, in addition to the parts already mentioned, I employ a system of air pipes connected to the engine. These pipes 9 and 10 are connected independently with the compressed air means by suitable pipes 9ª and 10ª. Pipe 9 delivers the compressed air in jets, below and without the engine, through leg-like fixtures 99 which are forced into the sludge mass at the outset of the operation. (See Fig. 1). The operation obviously may be performed by a separate instrument if preferred. The pipe 10 delivers air jets within the engine, near the bottom thereof, for the purpose of agitating the sludge material after it is forced into the engine and before it is forced out by air pressure.

The operation is as follows: The sludge engine being placed in the basin with the valve 7 closed and the sludge and water in the catch basin having been suitably stirred and thoroughly mixed and equalized by air jets from legs 99, the valve 8 is operated to connect the pipe 4 with the vacuum means, as described herein, the tank B. The air in the sludge engine is immediately highly rarefied, the check valve 3 closing to prevent ingress of air through the eduction pipe 2 and upon the lifting of valve 7 atmospheric pressure forces an inrush of sludge through aperture 6 until the pipe 4 is stopped by float 5 rising on the surface of the incoming sludge. The valve 7 is now closed and the valve 8 is turned to close the way to the vacuum tank and open the way to the compressed air source. The space between the surface of the sludge and the top of tank 1 is instantly filled with compressed air, pressing upon the upper surface of the sludge with a pressure (say) of 50 pounds to the square inch. There is no balancing pressure in the eduction pipe 2 and the semi-liquid mass of sludge, therefore, rises rapidly in the eduction pipe and is discharged at its open end, into any suitable receptacle, for example, a cart. The pressure of the compressed air in the engine is kept practically constant as the sludge content is driven out. If one operation of the sludge engine does not empty the catch basin, the operation above described is repeated until the basin is evacuated.

During the filling and discharging operation, air is preferably discharged through pipe 10 into the sludge within the engine to keep it in such violent agitation from the expanding and rising air that all possibility of any deposit is precluded. In certain cases, as for example, when the sludge is preponderantly of sand or other quickly settling material, the pressure air may be admitted through the pipe 10, thus utilizing the compressed air, first to agitate the material in the tank and second, to accumulate pressure above the material to evacuate the same.

The cart employed to receive the evacuated sludge may be of any ordinary construction and at the outset the tail board is adjusted to give a certain depth for the reception of sludge. The solid matter as the sludge is thrown into the cart settles to the bottom of the cart and any surplus of water will overflow the adjusted tail board, acting as a dam, and promptly find its way back to the catch basin to be used as and if necessary, in liquefying the compact deposit or sludge. Thus, only solid material will be transported to the "dump" or other place for depositing the catch basin accumulation of solid matter.

There are, of course, other applications of my method and apparatus to analogous subject-matters, which will suggest themselves. For example, in many sewage systems, there are sections of sewer where the flow of sewage is sluggish and in these there is apt to be a settling of solid matter. This matter is different in character from that ordinarily met with in catch basins, as the bulk of it is discharged directly into the sewer from a great variety of sources, and is as varied in character as it is in sources. To such application as evacuating ground water from trenches, bilge water, pulps, slimes, soft grease and the like my system and means is easily applicable.

I claim:

1. The method of sludge evacuation above described, consisting in agitation of the sludge content of a catch basin; placing an air tight sludge engine therein; creating a vacuum in the sludge engine; breaking the vacuum by suddenly permitting the agitated sludge to be forced into the engine by atmospheric pressure on the surface of the contents of the catch basin; forcing out the contents of the engine by admitting compressed air to the interior of the engine.

2. A sludge evacuation engine, made up of an air tight tank; an eduction pipe leading from near the bottom thereof to the delivery point for the sludge; an entrance valve in the tank for sludge ingress; means to create at will a partial vacuum in the sludge engine; means to force at will air under compression into the sludge engine, the sludge engine being provided upon its under side with downwardly projecting air pipes, adapted to be connected to a compressed air source.

3. A sludge evacuation engine, made up of an air tight tank; an eduction pipe leading from near the bottom thereof to the delivery point for the sludge; an entrance valve in the tank for sludge ingress, means to create at will a partial vacuum in the sludge engine; means to force at will air under compression into the sludge engine and means to agitate the sludge material beneath the tank.

Signed at Boston, Massachusetts, this thirteenth day of August, 1918.

TIMOTHY F. CALLAHAN.